United States Patent [19]

Gilbert

[11] Patent Number: 4,729,154

[45] Date of Patent: Mar. 8, 1988

[54] METHOD OF MAKING AND OPERATING A VERY HIGH SPEED MARGINALLY LUBRICATED BALL THRUST BEARING

[75] Inventor: Robert B. Gilbert, Phoenix, Ariz.

[73] Assignee: The Garrett Corporation, Los Angeles, Calif.

[21] Appl. No.: 936,853

[22] Filed: Dec. 2, 1986

[51] Int. Cl.[4] ............................................. B21D 53/10
[52] U.S. Cl. ......................... 29/149.5 R; 29/148.4 R; 29/149.5 C; 29/149.5 NM
[58] Field of Search ................... 29/148.4 R, 148.4 A, 29/149.5 R, 149.5 C, 149.5 NM

[56] References Cited

U.S. PATENT DOCUMENTS

| | | |
|---|---|---|
| 1,332,176 | 2/1920 | Heindlhofer . |
| 2,158,156 | 5/1939 | Schroder . |
| 3,027,626 | 4/1962 | Murphy . |
| 3,051,534 | 8/1962 | Kohler et al. .................. 29/148.4 A |
| 3,081,135 | 3/1963 | Olson ............................. 29/148.4 A |
| 3,097,897 | 7/1963 | Taylor . |
| 3,212,834 | 10/1965 | Mayer et al. . |
| 3,472,567 | 10/1969 | Johnson . |
| 3,567,504 | 3/1971 | Hopkins et al. . |
| 3,832,023 | 8/1974 | Fairbank . |
| 4,040,687 | 8/1977 | Rogers . |
| 4,311,348 | 1/1982 | Olschewski et al. .......... 29/148.4 R |
| 4,397,507 | 8/1983 | Kraus et al. . |
| 4,541,786 | 9/1985 | McLean . |

Primary Examiner—Howard N. Goldberg
Assistant Examiner—Ronald S. Wallace
Attorney, Agent, or Firm—Terry L. Miller; James W. McFarland

[57] ABSTRACT

A ball thrust antifriction bearing for operation at very high speed in the DN number range from $5 \times 10^5$ to $2 \times 10^6$ and higher while only marginally lubricated by a mist of liquid having comparatively poor lubricating qualities which is carried in a transporting air stream.

6 Claims, 2 Drawing Figures

METHOD OF MAKING AND OPERATING A VERY HIGH SPEED MARGINALLY LUBRICATED BALL THRUST BEARING

BACKGROUND OF THE INVENTION

The field of the present invention is antifriction bearings of the ball type having an annular inner and outer raceway containing the balls along with an annular separator member. More particularly, the invention relates to ball bearings for very high speed applications wherein only marginal, as opposed to flooded, lubricating and cooling fluid flow is provided to the bearing.

Ball bearings having steel races and steel balls and being capable of sustaining both radial and axial (thrust) loads under conditions of high speed operation are known. These bearings must be provided with adequate flow of lubricating and cooling liquid. This lubricating flow is provided by flooding the bearing with oil, or by providing a marginally lubricating oil mist carried in an air stream.

Also known are ball bearings for use at indeterminate speeds having steel inner and outer races and nonmetallic balls. These bearings may employ ball elements of gem stone or mineral. Such a teaching is set forth in U.S. Pat. No. 1,332,176, issued Feb. 24, 1920 to K. Heindlhofer. Alternatively, these bearings may employ ball elements of ceramic or glass material. A ball bearing teaching the use of ceramic ball elements for decidedly low speed operation is set forth in U.S. Pat. No. 2,158,156, issued May 16, 1939 to H. Schroder. Bearings having steel races and steel or ceramic ball elements have been employed for moderately high speed operation with oil flood or marginal oil mist lubrication in an air flow.

However, in selected aerospace turbine engine applications it is desirable to employ the jet fuel of the engine as lubricant and coolant in the engine bearings. Unfortunately, when compared with oil, jet fuel is not a good lubricant. Ball bearings of known construction have been employed with steel balls flooded or marginally lubricated by JP-4 jet fuel with moderate success up to a DN number of about $5 \times 10^5$. Those skilled in the bearing art will recognize the DN number as being the product of bearing inner race bore diameter in millimeters and rotational speed during use in rotations per minute (RPM). However, when operated with other fuels, such as JP-5, these same bearings have failed under the same operating conditions. JP-4 fuel is recognized as containing trace elements such as sulphur and nitrogen compounds which are not present to the same extent in JP-5 fuel, and which are thought to act as lubricants.

Accordingly, conventional thinking in the bearing art has held heretofore that a ball bearing having steel inner and outer races and steel or ceramic ball elements could not be operated at DN numbers above $5 \times 10^5$ when lubricated by jet fuel. The demands of advancing technology in the aerospace turbine engine field call for ball thrust bearings capable of operating at DN numbers above $5 \times 10^5$, and desirably for very high speed operation in the DN number range of $1 \times 10^6$ to $2 \times 10^6$, or higher. This operating speed range is, of course, well beyond the known operating limits for lubrication of a ball bearing with jet fuel.

SUMMARY OF THE INVENTION

In view of the above, it is a primary object for this invention to provide a ball thrust bearing capable of sustaining operation at high speed above a DN number of $5 \times 10^5$ while lubricated by jet fuel.

A further object of the invention is to provide such a bearing capable of sustained operation at very high speed in the DN number range from $1 \times 10^6$ to $2 \times 10^6$, or higher, while lubricated by jet fuel.

Additionally, an object of the invention is to provide such a bearing capable of operation up to a DN number of about $1.7 \times 10^6$ while marginally lubricated only by jet fuel mist in an air stream.

Still further, an object is to provide a bearing capable of operation at a DN of $1.7 \times 10^6$ while marginally lubricated by any jet fuel chosen from the group consisting of JP-4, JP-5, and JP-10.

Accordingly, the Applicant has happily discovered that a ball thrust bearing according to the invention having steel inner and outer races, with silicon nitride ceramic balls, and a Vespel polyimide SP-21 separator member will surprisingly operate completely successfully at a DN number of above $5 \times 10^5$ while only marginally lubricated with any one of the previously identified jet fuels. Vespel polyimide SP-21 is a product of E. I. DuPont de Nemours.

In the course of seeking a solution to the above-recited objects, the inventor tested known bearing constructions. All conventional bearings tested failed to meet the objectives of the present invention, which was expected in view of the state of the bearing art. For example, a ball thrust bearing having steel inner and outer races, with steel ball elements, and a silver plated steel separator failed after just a few seconds of operation at 37,000 RPM while marginally lubricated with a mist of JP-10 jet fuel in an air stream. This bearing had an inner diameter of 45 mm., so that the DN number was $1.67 \times 10^6$.

An unexpected result of the present invention has been completely successful operation by the Applicant of bearings according to the invention at a DN number of $1.67 \times 10^6$ while only marginally lubricated by JP-4, JP-5, or JP-10 liquid mist in an air stream. Still more surprisingly, bearings according to the invention have been operated while lubricated as described above from zero speed at $-65°$ F., with a rapid spin up to 37,000 RPM in as little as six seconds so that the bearing is subjected to full operating speed while very cold. Thereafter the bearing warms to operating temperature expected within a turbine engine and continues operation for a set time. Such use simulates a high-altitude cold start of a turbine engine and is recognized as being very severe on the bearing because of the dimensional changes which occur while the bearing is increasing in temperature at high or very high operating speeds. The rapid spin up while at low temperature did not cause any internal damage to the bearings tested which might have shortened their service life.

These and other objects and advantages of my invention will appear from a reading of the following detailed description of a single preferred embodiment of the invention in conjunction with the drawing Figures.

Teachings of the bearing art which may be considered relevant to my invention are found in the following patents, two of which have previously been referred to herein:

| PATENT NUMBER | ISSUED | PATENTEE |
| --- | --- | --- |
| 1,332,176 | 2/24/20 | Heindlhofer |
| 2,158,156 | 5/16/39 | Schroder |
| 3,027,626 | 4/3/62 | Murphy |
| 3,097,897 | 7/16/63 | Taylor |
| 3,212,834 | 10/19/65 | Mayer et al |
| 3,472,567 | 10/14/69 | Johnson |
| 3,567,504 | 3/2/71 | Hopkins et al |
| 3,832,023 | 8/27/74 | Fairbank |
| 4,040,687 | 8/9/77 | Rogers |
| 4,397,507 | 8/9/83 | Kraus et al |
| 4,541,786 | 9/17/85 | McLean |

DETAILED DESCRIPTION OF THE PREFERRED EMBODIMENT OF THE INVENTION

Figure 1:
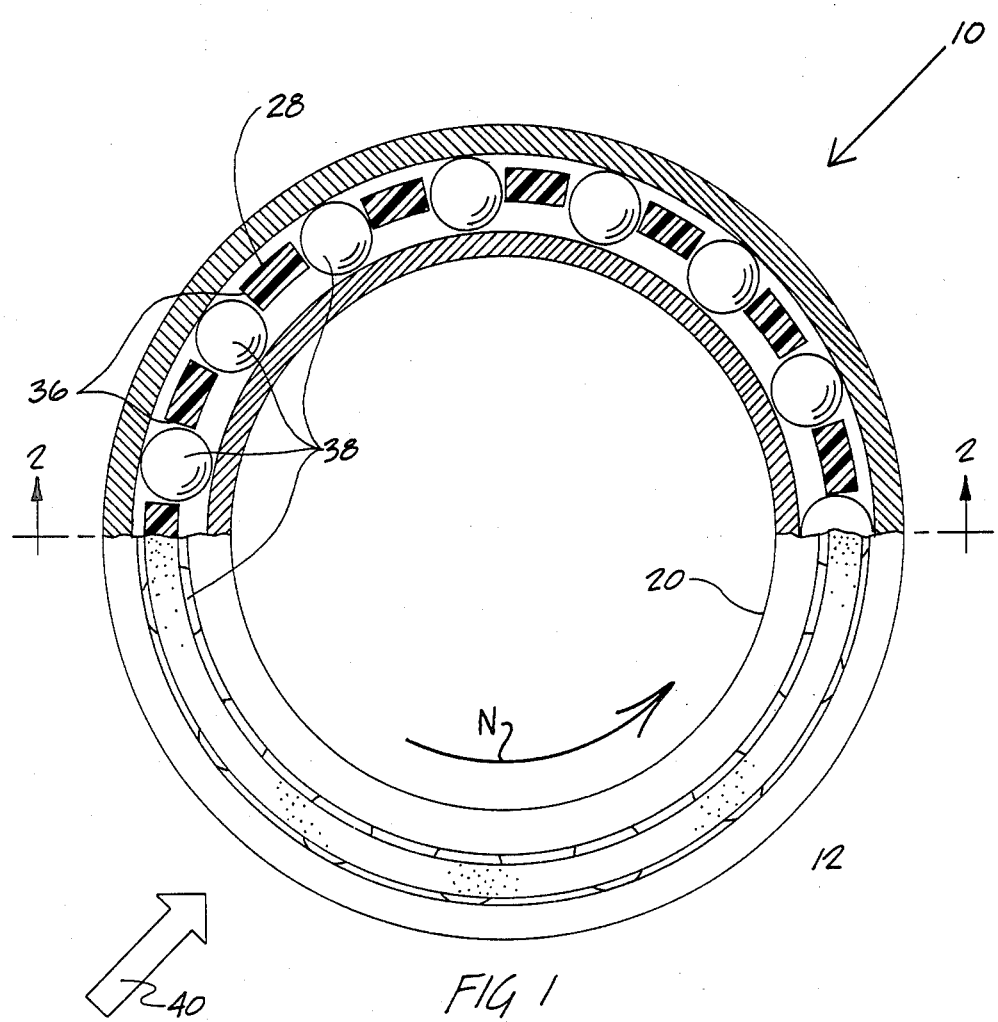
FIG. 1 is a side elevational view of a ball bearing embodying the invention, with parts broken away and partially in section to better illustrate the structure thereof.
Figure 2:
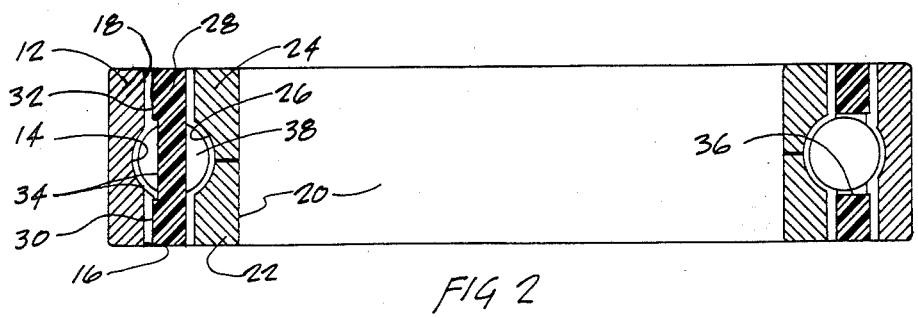
FIG. 2 depicts a cross-sectional view taken along line 2—2 of FIG. 1.

FIGS. 1 and 2 taken together depict a bearing 10 according to the present invention. Bearing 10 includes an outer annular race member 12 constructed of conventional bearing quality steel alloy and having a radially inwardly disposed arcuate bearing race groove 14 disposed between axially spaced apart cylindrical surfaces 16,18. Within the outer race member 12 is disposed a two-piece, inner annular race member generally referenced with the numeral 20. The race member 20 is also constructed of bearing quality steel and includes two substantially mirror image sections 22,24 which cooperate to define a radially outwardly disposed bearing race groove 26 confronting groove 14.

Interposed between the inner race member 20 and outer race member 12 is a single-piece annular separator member 28. The separator member defines a pair of axially spaced apart radially outwardly disposed rubbing surfaces 30,32 which lie on opposite sides of a groove 34 thereon, and which confront surfaces 16,18 of outer race member 12. The separator member 28 also defines a plurality of circumferentially spaced apart ball-receiving cylindrical openings or bores 36 extending radially therethrough. The separator member 28 is made from DuPont Vespel SP-21 which is believed to be a polyimide polymer loaded homogeneously with about 20% carbon graphite solid lubricant. Consequently, it will be seen the separator member 28 assists in lubrication of the bearing 10. Also, it must be noted that while the rubbing surfaces 30,32 of separator member 28 confront and may, due to gyration of separator member 28, actually contact the surfaces 16,18 of outer race member 12, these surfaces are desirably spaced apart to define a radial clearance therebetween.

Received in the openings 36 and grooves 14,34 of the bearing 10 is a plurality of ball rolling elements, each referenced with the numeral 38. The ball elements 38 make rolling contact with each of the inner race member 20 and outer race member 12 to allow low-friction relative rotation thereof (arrow N, viewing FIG. 1). Because the grooves 14 and 34 are both relatively deep in relation to the diameter of balls 38, the bearing 10 is able to sustain a considerable axial (thrust) load in addition to radial loads. Ball elements 38 are fabricated from solid silicon nitride ceramic. The ball elements 38 as well as surfaces of grooves 14 and 34 are ground to smooth surface finishes conventional in the bearing art.

During operation of the bearing 10 at DN of $5 \times 10^5$ or higher a lubricating and cooling mist of jet fuel is provided in a stream of air, depicted by arrow 40 viewing FIG. 1. The stream of air serves to transport the jet fuel mist and is not, the Applicant believes, essential to successful operation of bearing 10 at very high speeds. As has been mentioned, the jet fuel mist cannot be considered very effective lubricant. However, the jet fuel, by its heat of vaporization, is believed to cool the bearing 10 and prevent generation of excessively high temperature therein. The Applicant also believes the separator member 28 is very important to successful operation of the bearing 10 at very high speeds contemplated by the present invention. In other words, the Vespel SP-21 of which separator member 28 is made has been found to be very lubricious, or to possess a very low coefficient of friction, in combination both with the steel of inner and outer races 12,20, and the silicon nitride ball elements 38. Consequently, an overall low coefficient of friction is achieved among all of the component parts of bearing 10.

As mentioned hereinbefore, testing of bearings according to the present invention has verified the surprising and unexpected result of the presently disclosed combination of construction materials. Bearings according to the present invention have been operated at DN numbers well above $5 \times 10^5$, and as high as about $1.7 \times 10^6$ with only marginal jet fuel mist lubrication as described with completely satisfactory results. Further, any of the jet fuels JP-4, JP-5, or JP-10 may be used to lubricate the present inventive bearing. On the other hand, operation of the best conventional bearings at DN numbers of $1.7 \times 10^6$ and the same lubrication conditions results in utter failure of the bearings in very short time.

While my invention has been depicted and described herein by reference to a particularly preferred embodiment thereof, no limitation upon the invention is implied by such reference, and none is to be inferred. My invention is intended to be limited only by the scope and spirit of the appended claims which also provide additional definition of the invention. Several modifications to my invention may suggest themselves to those skilled in the bearing art, and are intended to fall within the scope of the appended claims. For example, the Applicant has disclosed the use of DuPont Vespel polyimide SP-21 as a material of construction for separator member 28. However, other materials having sufficient mechanical strength, compatibility with jet engine fuels, and lubricity may also suffice to circumferentially space apart the ball elements 38 while preserving an overall low coefficient of friction for the bearing 10.

Having described my invention with sufficient clarity to allow one skilled in the art to make, use, and practice the invention, I claim:

1. The method of making and operating a very high speed ball bearing for operation in the range of DN numbers from $5 \times 10^5$ to $1.7 \times 10^6$ and higher while only marginally lubricated in operation by a mist of liquid jet engine fuel carried in a transport air stream, said method comprising the steps of:

providing both an annular radially inner and annular radially outer ball race member, defining on each ball race member a cooperable annular ball race groove confronting the other said ball race member, fabricating each said ball race member from bearing quality steel;

interposing radially between said ball race members a plurality of ball elements in said ball race grooves and in rolling contact with both said ball race members to provide low-friction relative rotation thereof, making said plurality of ball elements each of solid ceramic material;

interposing radially between said ball race members an annular separator member, defining in said separator member a matching plurality of circumferentially spaced apart openings radially extending therethrough, disposing in each one of said matching plurality of openings, one of said plurality of ball elements to circumferentially space apart the latter, making said separator member of inherently lubricious material;

operating said ball bearing at a speed whereat the DN number is in the range from $5 \times 10^5$ to $1.7 \times 10^6$ or higher where D is the inner diameter of said radially inner annular ball race member in millimeters and N is the relative rotational speed between said ball race members in rotations per minute;

while operating said ball bearing, providing a marginally lubricating mist of liquid jet engine fuel in a transporting air stream directed upon said bearing.

2. The method of claim 1 wherein the step of providing said jet fuel mist comprises the addtional step of selecting said liquid from the group of jet fuels including JP-4, JP-5, and JP-10.

3. The method of claim 1 wherein the step of making said separator member of inherently lubricious material includes making said separator member of a polymer having carbon graphite therein.

4. The method of claim 3 wherein said step of selecting said polymer includes the step of selecting polyimide as said polymer.

5. The method of claim 4 wherein said step of selecting said polyimide polymer includes selecting DuPont Vespel SP-21 as said polymer.

6. The method of claim 1 wherein said step of making said ball elements comprises the additional step of selecting silicon nitride as said ceramic material.

* * * * *